Oct. 17, 1939.  G. C. T. KUNKLE  2,176,631
ANTISKID CHAIN
Filed Dec. 10, 1936  2 Sheets-Sheet 1

Oct. 17, 1939.   G. C. T. KUNKLE   2,176,631
ANTISKID CHAIN
Filed Dec. 10, 1936   2 Sheets-Sheet 2

Inventor
George C. T. Kunkle
Vernon E. Hodges and
H. Hamlin Hodges
Attorneys

Patented Oct. 17, 1939

2,176,631

UNITED STATES PATENT OFFICE 2,176,631

ANTISKID CHAIN

George C. T. Kunkle, Lancaster, Pa.

Application December 10, 1936, Serial No. 115,223

6 Claims. (Cl. 152—233)

My invention relates to an improvement in antiskid devices.

The design of modern automobile wheels has changed considerably from the wheels which were used in the past, and it is generally found to be the case that modern wheels are either provided with very short metal spokes or even no spokes at all. The result of this change in wheel design has been that while antiskid chains which are at present on the market may be attached to some of these modern wheels, the attachment of them is considerably harder than it was in the past. In the case of the popular individual link chains, it has been found that because of the short spokes and relatively slight space between them, it is practically impossible to attach these individual chain links since the strap which passes around the felly of the wheel often can not be inserted between the spokes.

While I have referred to the change in design in modern automobile wheels, it will, of course, be understood that my antiskid device may be as readily applied to tires mounted on any type of automobile wheel, that is, automobile wheels which have been used for years in the past, such as those provided with comparatively long spokes.

An object of my invention is to provide an antiskid chain which may be easily and speedily attached to the wheel of an automobile or to a wheel of similar type.

A further object is to provide an antiskid cross link holding device which may be adjusted to an automobile wheel by two simple adjustments to properly position three or more sets of cross-links.

A still further object is to provide an antiskid chain device which may be positioned on an automobile wheel, whether the wheel is provided with wooden spokes, wire spokes, metal spokes, or is a solid disk.

Another object of my invention is to provide an antiskid device which not only may be easily applied to an automobile wheel, but may be readily removed from that wheel after the necessity of the use of the antiskid device no longer exists.

In the accompanying drawings:

Fig. 4 is a cross-section on the line 4—4 of Fig. 2; and

Fig. 5 is an enlarged detail plan view of the catch for the inside ring of my antiskid device.

Figure 1:
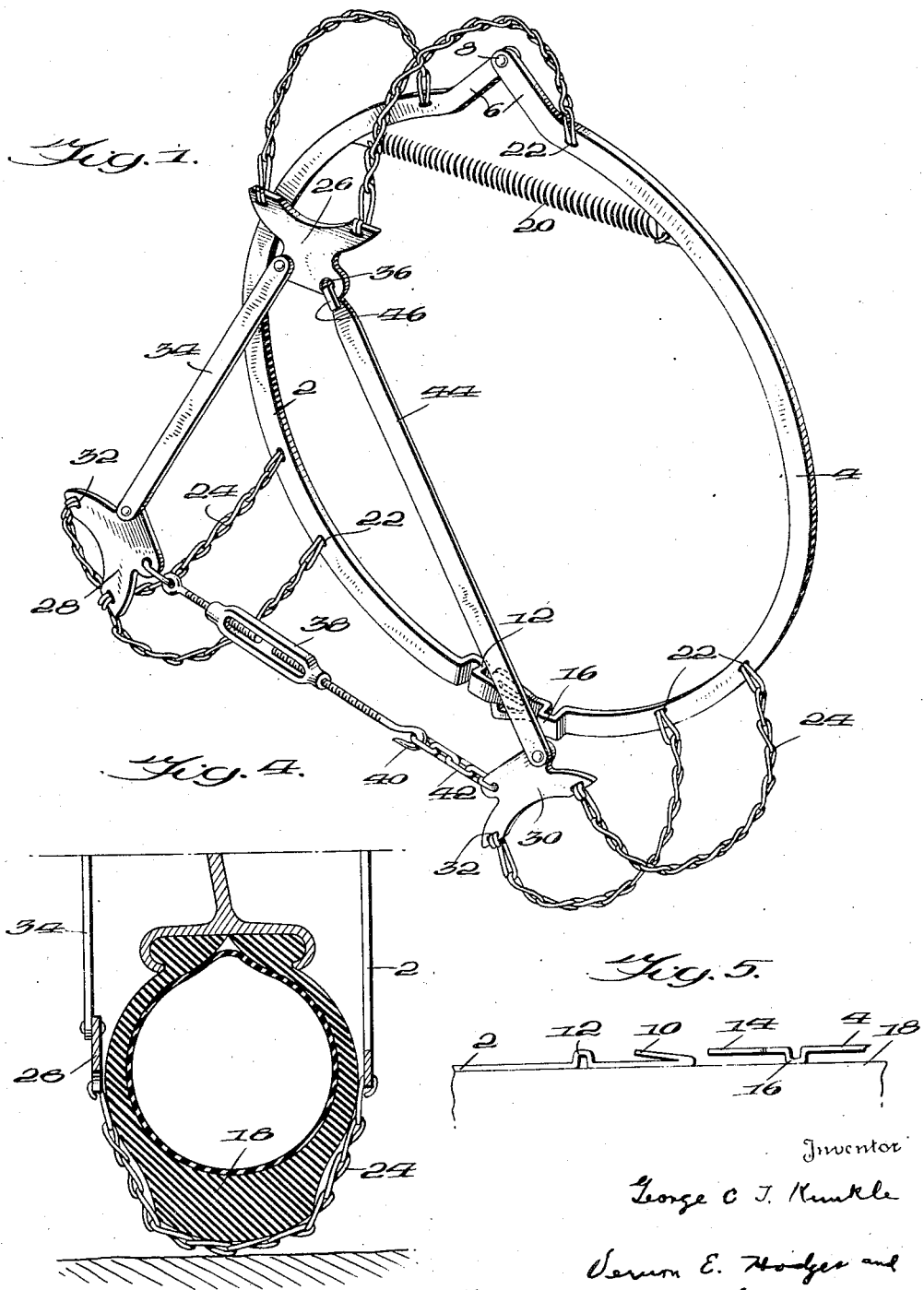
Fig. 1 is a perspective view of my antiskid device in position it would take when mounted on a wheel.

Two approximately semi-circular rods 2 and 4, are preferably made of light rustless metal, each of which is provided with slightly upturned arms 6, which arms are pivoted together by a pivot 8. The purpose of these upturned arms 6 is that when the rods 2 and 4 are in their opened position, the arms 6 will assume a position in approximately a straight line, and consequently no sharp corners will be provided which might dig into the side walls of the automobile tire to which my device is being applied. Also these arms 6 extend somewhat outwardly from the periphery of the two semi-circular rods 2 and 4, so that the pivot 8 will form a fulcrum point further remote from the spring, which will be more fully described hereinafter, which is adapted to tend to pull the two semi-circular rods 2 and 4 together.

At the end of the semi-circular rod 2, remote from the upturned arm 6, I provide a hook 10, or one part of some other convenient locking device, and a slightly raised portion 12. On the end of the semi-circular rod 4, remote from the upturned arm 6 thereof, I provide an eye 14, or the other part of a convenient locking device, and a slightly raised or ridged portion 16, which is positioned on the side of the semi-circular ring 4, opposite to the side on which the raised portion 12 is provided on the semi-circular rod 2.

The purpose of the raised portion 16 is to bear slightly against the tire 18 and to hold the eye 14 a predetermined distance away from the tire 18, so that as the ends of the rods 2 and 4 are urged together by the action of the spring 20, the hook 10 may readily pass between the eye 14 and the tire 18 to be in position for engagement in the eye 14. The spring 20 is attached to the semi-circular rods 2 and 4 at a convenient point near the upturned arm 6 to properly pull together the ends of the semi-circular rods 2 and 4, which are provided with the hook 10 and the eye 14. The primary purpose of the raised portion 12 on the semi-circular rod 2 is to prevent the eye 14 from passing too far past the hook 10 as the hook and eye are brought together when the antiskid device is being placed upon a tire.

At spaced apart positions on the semi-circular rods 2 and 4, I provide a plurality of apertures 22, through which hooked ends of the cross-links 24 may be attached. While I have shown these cross-links 24 as being chain cross-links, it will be understood that any other type of cross-link may be utilized, such, for example, as cross-links made of specially prepared rubber, fibre, or wire.

Figure 2:
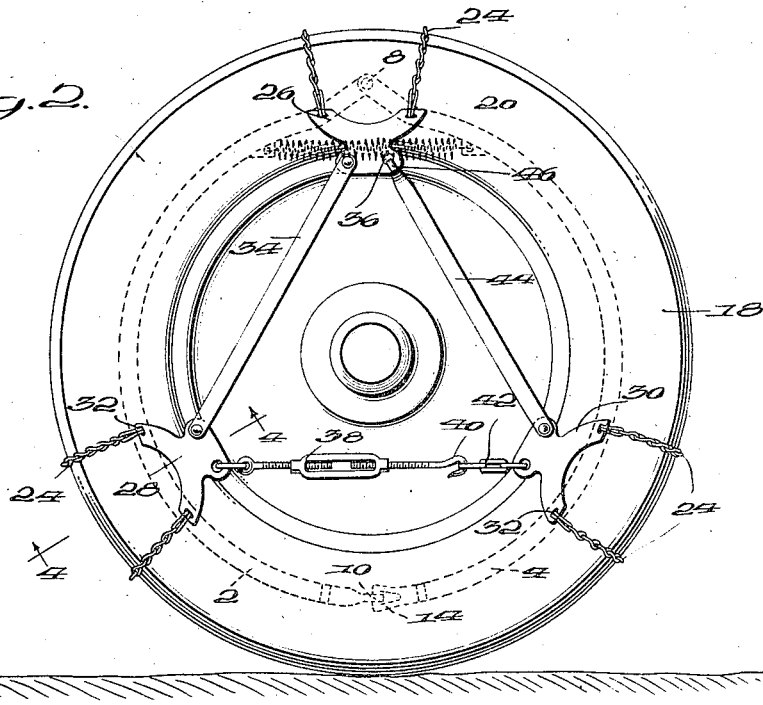
Fig. 2 is a front elevation looking toward the outside of a wheel.
Figure 3:
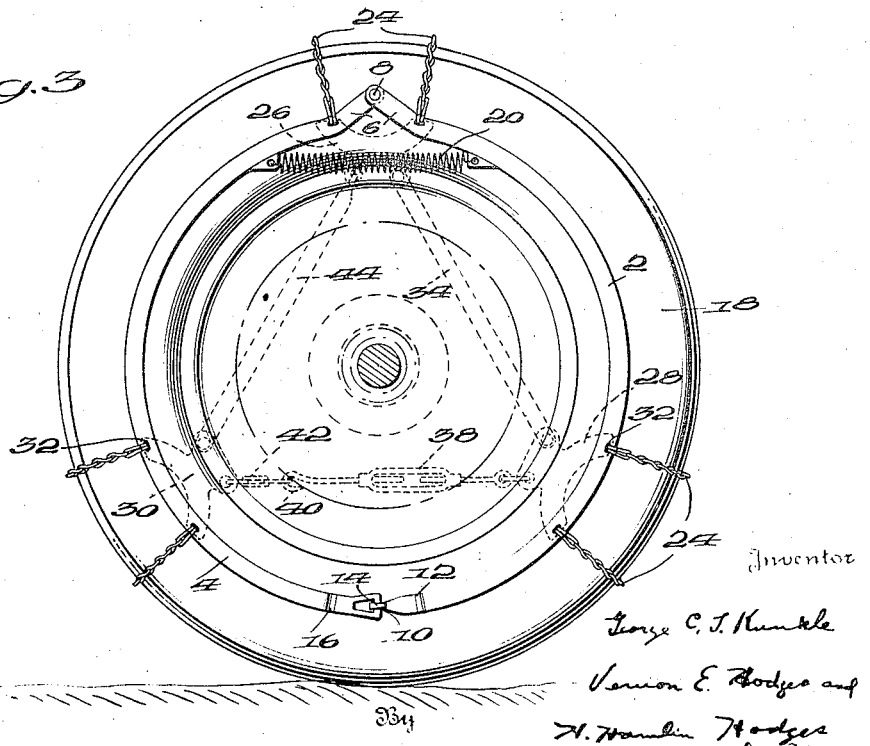
Fig. 3 is a rear elevation looking toward the inside of a wheel.

On the outside of the wheel, as shown more particularly in Fig. 2, I provide suitable approximately Y-shaped brackets 26, 28 and 30. These brackets 26, 28 and 30 are substantially identical, each of them being provided with two apertures 32 into which hooks on the cross-links 24 may be secured. The bracket 26 has on one side of its lower leg a rod 34 pivoted thereto. This rod 34 is likewise pivoted to the lower leg of the bracket 28. This rod 34 may be fixed to the brackets 26 and 28 by such means as welding or riveting or may even be made in one piece with the brackets 26 and 28, if such a construction is found to be more desirable.

Also on the lower leg of the bracket 26 I provide an aperture 36, the purpose of which will be described more fully hereinafter. The bracket 28 is likewise provided with an aperture on its lower leg to which is secured a single link or one end of a suitable turn-buckle 38 or some other adjustable fastening means. The other end of the turn-buckle 38 is provided with a hook 40, which is adapted to be secured in a short length of chain 42, which is secured to an aperture in the lower leg of the bracket 30. The lower leg of the bracket 30 has pivotally attached thereto a rod 44, which is provided at its end remote from the bracket 30 with a hook 46.

After the two semi-circular rods 2 and 4 have been placed in position around a wheel, the hook 10 is in position to engage the eye 14, the hook 46 on the rod 44 is then placed through the aperture 36 in the lower leg of the bracket 26, after which time the hook 40 is engaged in a link of the short chain 42 and the turn-buckle 38 is adjusted to draw the brackets 28 and 30 toward one another, and, consequently, to tighten the several cross links 24 around the tire.

As the semi-circular rods 2 and 4 are being placed into position around a wheel, the spring 20 tends to pull the hook 10 and the eye 14 to a position so that these elements will overlap, and the end of the hook 10 will come into contact with the raised portion 16 on the semi-circular rod 4, while the end of the eye 14 comes into contact with the raised portion 12 on the semi-circular rod 2. While the hook 10 and the eye 14 are automatically held in this position, it may be readily understood that they will engage one another as soon as the cross-link 24 attached to the bracket 30 is placed into its adjusted position, as described above.

In adjusting my antiskid device on a tire, the following procedure is followed:

The hook 40 is disenaged from the short chain 42, and the hook 46 is disengaged from the hole 36 in the bracket 26. Thus the bracket 30 with its two cross-links 24, is entirely disconnected from the brackets 26 and 28, it, therefore, being secured only to the semi-circular rod 4. After the device has been opened to this position, the two semi-circular rods 2 and 4 are spread apart even more than to the position in which they are shown in Fig. 5, and are placed over the tire 18 to be brought together by the spring 20, so that the hook 10 will be in position to become engaged in the eye 14 automatically upon adjustment of the turn-buckle 38 which will be described more fully hereinafter.

After this has been done, the cross links 24 which are attached to the brackets 26 and 28 may be pulled to an approximately adjusted position over the tire 18. Following this, the cross links 24 attached to the bracket 30 are placed into their approximately adjusted position, the hook 46 on the rod 44 is hooked into position through the aperture 36 of the bracket 26, and to complete the connection of the several sets of cross links 24, the hook 40 of the turn-buckle 38 is then positioned into a convenient link of the short chain 42 and the turn-buckle 38 is tightened until all of the cross-links 24 have been tightened around the tire 18 to tend to draw the semi-circular rods 2 and 4 apart and thereby causing the automatic engagement of hook 10 and eye 14 and thereafter keeping the hook 10 and the eye 14 engaged. After the turn-buckle 38 has been tightened and adjusted, the cross-links 24 will be tightened around the tire 18 and will tend to pull the semi-circular rods 2 and 4 apart. This, obviously, is prohibited by the hook 10 being previously in position to be engaged within the eye 14, and thus the tension of the turn-buckle 38 securely holds the semi-circular rods 2 and 4 together.

While I have shown only three sets of cross-links, it may be readily understood that a greater plurality of cross links may be provided by merely changing the relative position on the semi-circular rods 2 and 4, where these cross-links are attached.

While I have described and illustrated one form of my invention, it will be understood that several minor changes might readily be made at the time this device is being made for commercial use.

It will be understood that these minor changes in construction may be made from time to time without departing from the spirit of the invention and the scope of the appended claims.

I claim:

1. An antiskid device including an approximately circular ring, tire cross-links secured to said ring, brackets attached to said cross-links remote from said ring, one-piece bars securing two of said brackets to a third bracket, and a turn-buckle securing the said two brackets together.

2. An antiskid device including two approximately semi-circular rods pivoted together, cross-links secured to said semi-circular rods, brackets secured to said cross-links, self-engaging means securing said semi-circular rods together, and means adjustably connecting said brackets together, said self-engaging means including a hook, an eye, and shoulders positioned to prohibit the hook sliding past the eye.

3. An antiskid device including two approximately semi-circular rods pivoted together, cross-links secured to said semi-circular rods, means securing said cross-links in adjusted position around a tire, and arms extending outwardly from the curvature of said semi-circular rods providing a pivot point for said rods.

5. An antiskid device including two approximately semi-circular rods, cross-links secured to said semi-circular rods, means securing said cross-links in adjusted position around a tire, and arms extending outwardly from the curvature of said semi-circular rods at one pair of ends thereof, said outwardly extending arms providing a pivot point for said rods.

5. An antiskid device including three main units, one of which is self-fastening and consists of pivotally connected rods, another constituted by cross-links connected with the self-fastening means at intervals to receive and embrace the tire, and an adjustable tensioning means connected with the other ends of the cross links, and indirectly to the self-fastening unit.

6. An antiskid chain including approximately semi-circular rods, cross-links secured to said semi-circular rods, brackets secured to said cross-links, and means adjustably securing said brackets together, said semi-circular rods pivotally secured together and provided at the other ends of the semi-circles with self-fastening means to position said semi-circular rods in a circle, said self-fastening means including a hook, an eye, and shoulders positioned to prevent the hook and eye from sliding past one another beyond engaging position.

GEORGE C. T. KUNKLE.